United States Patent [19]
Hyman, Jr.

[11] 3,886,082
[45] May 27, 1975

[54] CERENKOV WAVE-SHIFTING COMPOSITION AND PROCESS

[75] Inventor: Mark Hyman, Jr., Belmont, Mass.

[73] Assignee: Pilot Chemicals, Inc., Watertown, Mass.

[22] Filed: Mar. 6, 1972

[21] Appl. No.: 232,299

Related U.S. Application Data

[63] Continuation of Ser. No. 45,920, June 12, 1970, abandoned.

[52] U.S. Cl.. 252/301.2 R; 250/361; 252/301.2 SC; 252/301.3 R
[51] Int. Cl. ............................................. G01t 1/22
[58] Field of Search ............... 252/301.2 R, 301.3 R

[56] References Cited
UNITED STATES PATENTS 3,068,178   12/1962   Kallmann et al............. 252/301.2 R
3,457,180   7/1969   Kretz et al. .................. 252/301.2 R
3,461,288   8/1969   Oster........................... 252/301.2 R

OTHER PUBLICATIONS

Cosme et al., Nuclear Instruments and Methods, 70(1969), 20–24.

Primary Examiner—Daniel E. Wyman
Assistant Examiner—A. P. Demers
Attorney, Agent, or Firm—Rines and Rines; Shapiro and Shapiro

[57] ABSTRACT

This disclosure deals with solid plastic-base Cerenkov counter materials of inherent negligible or readily quenchable scintillation characteristics containing, despersed therethrough, much less than a percent of a wave-shifter material, such as a fluor.

9 Claims, No Drawings

CERENKOV WAVE-SHIFTING COMPOSITION AND PROCESS

This is a continuation of application Ser. No. 45,920, filed June 12, 1970, now abandoned.

The present invention relates to Cerenkov counter media, being more particularly directed to compositions and process for shifting the Cerenkov radiation produced in solid plastic media of inherently negligible or readily quenchable scintillation characteristics to higher wavelengths.

Light shifters have heretofore been added to, for example, liquid Cerenkov counters and the like to provide light gain by converting the directional Cerenkov radiation cone to a non-directional higher-wavelength radiation, as described, for example, in Nuclear Instruments and Materials, Volume 70 (1969) p. 20–24, North-Holland Publishing Company, "A Study Of The Use Of Light Shifting Substances in Cerenkov Radiators Application To A $K^+$ Counter," by A. Cosme at al. Unfortunately, the substances and proportions used, and the configurations required, are not adapted for solid counter materials. Many such solid materials, moreover, have been considered unusable for this type of operation because of the inherent masking scintillation radiation produced by the solid material.

An object of the present invention, accordingly, is to provide new and improved compositions and processes for adapting solid plastic-based Cerenkov counters for such light-gain effects and other advantages, including more efficient light transmission, flowing from the use of wave-shifters, and without masking the effects by inherent scintillations.

A further object is to provide, more generally, novel Cerenkov counter compositions.

Other and further objects will be explained hereinafter and are more particularly delineated in the appended claims. In summary, however, the invention embraces a base of solid light-transmitting plastic material of inherent negligible or readily quenchable scintillation characteristics and containing, dispersed throughout the base material, a quantity equal to preferably much less than a percent of relatively low wavelength Cerenkov-radiation-absorbing and relatively higher wavelength-re-emitting wave-shifting material. Preferred details are hereinafter set forth, it being considered unnecessary to provide a drawing in view of the nature of the description of the invention.

One feature of the invention resides in the discovery of a rather critical and fractional percentage range of certain kinds of wave-shifter materials that can be used with solid plastic base materials to attain the desired ends. In the case of base materials that have negligible inherent scintillation characteristics, such as the acrylic polymers and copolymers and certain glasses, appropriate initially proportioned wave-shifter materials have been found to be dispersible throughout the base material to attain waveshifting of the Cerenkov radiation produced by the impingment of charged particles, such as cyclotron or cosmic radiations, from the relatively low wavelength range, principally in the 2,000 to 3,500 Angstrom region of the Cerenkov radiations, up through the near ultraviolet and into the green region in the upper 4,000 Angstrom region, where efficient light transmission is effected in such base materials. The ratio of scintillation radiation to Cerenkov radiation is, of course, all important; and the added wave-shifters act to increase the inherent scintillation, such that the quantity to be added has been found to be rather critical to enable sufficient wave-shifting without producing masking quantities of inherent scintillation.

For the acrylic polymers and copolymers, fastdecay phosphors or fluor wave-shifters, such as Bis MSB (bis (o-methyl styryl) benzene) and others, later specified, in quantities less than a percent, and preferably in the range from substantially one-tenth to thousandths of a percent (and less), and more particularly in the range from substantially 0.25% to 0.0065%, have been found admirably to shift the Cerenkov radiation effectively up into the 4,000 to 4,700 Angstrom range without producing appreciable masking inherent scintillation and where the acrylics are most efficiently light transmitting (such as with a one-sixth attenuation coefficient for ultraviolet light of greater than 25 inches of material).

The re-emitted higher or shifted wavelength light, unlike the directional Cerenkov radiation, is, moreover, non-directional. In view of the above, sheets, curved and other configurations of the base material, including tubes, can be molded or formed and with exposed edges, much as in the case of solid scintillators, thus enabling the use of photocell and other count detecting techniques and structures at such edges with these Cerenkov solid counters, also. In addition, in view of the high light efficiency of the acrylics at these wavelengths, sheets of length and area much larger than the thickness, including even as much as eight feet long and longer, have been successfully made. Thus, solid waveshifted Cerenkov counters of vast dimensions have for the first time been provided, enabling uses unattainable with the prior-art liquid and other systems before described.

Where plastic base materials that do have a substantial inherent scintillation characteristic are to be used, moreover, such as vinyl toluene and other styrene derivatives, and the like, it has been found that the use of a small fraction of a percent of quencher, such as furfuralazine and other materials later mentioned, to the fractional percentage of fluor, can assist in differentiating the wave-shifted Cerenkov radiation from the inherent scintillations.

Compositions so constructed will now be described in detail.

EXAMPLE 1

A base plastic material slab of cyclohexylmethacrylate was combined with BPSB fluor wave-shifter material (bis (p-isopropyl styryl) benzene) to shift Cerenkov light produced by high energy cyclotron radiations and by cosmic energy, largely in about the 2,000 to 3,500 Angstrom range, up to the blue spectral region in the vicinity of 4,200 Angstroms at which the plastic was light transmitting and conventional phototubes could be efficiently used to detect the light radiation along a free edge of the slab. The procedure used in making the slab was first to add the BPSB fluor powder, in a quantity of about 0.025%, to the vacuumdistilled monomer of the base material and to heat the same, preferably under vacuum, with occasional shaking, completely to disperse and dissolve the fluor powder. The material was then heated overnight in a controlled manner at about 90°C, and then further heated at 120°C for about 24 hours to produce polymerization.

EXAMPLE 2

Similar cyclohexylmethacrylate sheets of similar wave-shifting properties were made, also, as in Example 1, and with about the same proportions, using PBD fluor (phenyl biphenylyl oxadiazole) and alkyl derivatives thereof.

EXAMPLE 3

The base plastic material here used was isobutyl methacrylate, with the dispersed fluor being a relatively large quantity (though still less than a percent) of about 0.25% of Bis MSB (bis (o-methyl styryl) benzene). This time, however, the polymerization was carried out with a small percentage of tertiary butyl peroctoate catalyst, with a first heating period of about 12 hours at about 60°C, and further 24-hour period at about 75°C. The said Cerenkov radiation was found to be shifted to the range of about 4,250 Angstroms.

EXAMPLE 4

Results similar to those of Example 3 were also obtained with a much smaller percentage of Bis MSB of about 0.025%.

The following further slabs were also similarly prepared:

EXAMPLE 5

Base material — isobutyl methacrylate
Fluors — combination of perylene and tetraphenyl-butadiene totalling about 0.025%.
Wave-Shift Result — up to about 4700 Angstroms, (blue-green).

EXAMPLE 6

Base material — vinyl toluene
Fluor — Bis MSB, about 0.025%
Quencher — small fraction of a percent of furfuralazine (differentially to quench scintillation radiation of the base material).

EXAMPLE 7

Same as Example 6, but with benzalazine quencher in same proportion.

EXAMPLE 8

Same as Example 6, but with anisalazine quencher in same proportion.

EXAMPLE 9

Base materials — combination (equal proportions) of methyl methacrylate and cyclohexylmethacrylate.
Fluor — Bis MSB, about 0.25%
Wave-Shifter Result — up to about 4,200 Angstroms.

EXAMPLE 10

Base material — methyl methacrylate
Fluor — Bis MSB, about 0.0065%
Wave-Shifting Result — up to about 4,200 Angstroms.

EXAMPLE 11

Base material — cyclohexylmethacrylate
Fluor — DPA (diphenyl anthracene), about 0.16%
Wave-Shifting Result — up to about 4,300 Angstroms.

Other fluors similarly used included POPOP (bis (phenyl oxazolyl benzene), dimethyl POPOP, and TPB (tetra phenyl butadiene) and other acrylic polymers and copolymers.

Further modifications will occur to those skilled in this art and all such are considered to fall within the spirit and scope of the invention as defined in the appended claims.

What is claimed is:

1. A Cerenkov counter medium composition consisting essentially of a base of plastic Cerenkov-radiating light-transmitting material solid at room temperature and of inherent negligible or readily quenchable scintillation characteristics and containing, dispersed throughout the base material, a qunatity from substantially 0.25 percent to thousandths of a percent of relatively low wavelength-absorbing and relatively higher wavelength-re-emitting wave-shifting fluor material, said composition being substantially devoid of additional scintillating material, said plastic base material being selected from the group consisting of polymethyl methacrylate, polycyclo hexyl methacrylate, polyisobutyl methacrylate, their copolymers, polyvinyl toluene, polystyrene, and glass, said fluor being selected from the group consisting of bis-(o-methylstyryl) benzene, p-Bis-[2-(5-phenyloxazolyl)]-benzene, dimethyl p-Bis[2-(5-phenyloxazolyl)]-benzene, 1,1', 4,4', -tetraphenylbutadiene, phenylbiphenylyloxadiazole-1,3,4, bis-(phenylstyryl) benzene,Diphenylanthracene, and perylene.

2. A Cerenkov counter medium composition as claimed in claim 1 and in which the said higher wavelength and the said light transmitting are in the spectral range from the near ultraviolet to green.

3. A Cerenkov counter composition as claimed in claim 1 and in which the base material comprises polymethyl methacrylate and the said wave-shifting material comprises bis-(o-methylstyryl)benzene.

4. A Cerenkov counter medium as claimed in claim 1 and in which the said range is from substantially 0.25% to 0.0065%.

5. A Cerenkov counter medium composition as claimed in claim 1 and in which said medium is formed in sheet configuration of length and area much greater than the thickness thereof and provided with a free edge for count detection.

6. A Cerenkov counter medium composition as claimed in claim 5 and in which said length is of the order of a plurality of feet.

7. A Cerenkov counter medium composition as claimed in claim 1 and in which there is added scintillation quenching material.

8. A Cerenkov counter medium composition as claimed in claim 7 and in which said quenching material comprises at least one of furfuralazine, benzalazine and anisalazine.

9. A Cerenkov counter medium composition as claimed in claim 8 and in which said base material is selected from the group constituted of polystyrene and polyvinyl toluene.

* * * * *